(12) United States Patent
Luetzelberger et al.

(10) Patent No.: US 8,452,986 B2
(45) Date of Patent: May 28, 2013

(54) SECURITY UNIT AND PROTECTION SYSTEM COMPRISING SUCH SECURITY UNIT AS WELL AS METHOD FOR PROTECTING DATA

(75) Inventors: Dirk Luetzelberger, Hamburg (DE); Henrik Przybilla, Hamburg (DE)

(73) Assignee: NXP B.V., Eindhoven (NL)

( * ) Notice: Subject to any disclaimer, the term of this patent is extended or adjusted under 35 U.S.C. 154(b) by 1104 days.

(21) Appl. No.: 11/631,214

(22) PCT Filed: Jun. 30, 2005

(86) PCT No.: PCT/IB2005/052183
§ 371 (c)(1),
(2), (4) Date: Jun. 4, 2009

(87) PCT Pub. No.: WO2006/003632
PCT Pub. Date: Jan. 12, 2006

(65) Prior Publication Data
US 2009/0300369 A1    Dec. 3, 2009

(30) Foreign Application Priority Data
Jul. 2, 2004    (EP) ..................................... 04103155

(51) Int. Cl.
*G06F 21/00*    (2006.01)
(52) U.S. Cl.
USPC ........................................................ 713/193
(58) Field of Classification Search
USPC ........................................................ 713/193
See application file for complete search history.

(56) References Cited

U.S. PATENT DOCUMENTS

| | | | |
|---|---|---|---|
| 5,559,757 A * | 9/1996 | Catipovic et al. .............. | 367/134 |
| 6,266,416 B1 | 7/2001 | Sigbjoernsen et al. | |
| 7,613,917 B1 * | 11/2009 | Chojnacki ...................... | 713/150 |
| 2001/0029581 A1 * | 10/2001 | Knauft ........................... | 713/193 |
| 2002/0003881 A1 * | 1/2002 | Reitmeier et al. ............. | 380/210 |
| 2002/0120847 A1 * | 8/2002 | Kamperman ................. | 713/170 |
| 2002/0194485 A1 | 12/2002 | Ram et al. | |
| 2003/0126430 A1 * | 7/2003 | Shimada et al. .............. | 713/155 |
| 2003/0158823 A1 * | 8/2003 | Fulton et al. ................... | 705/75 |

(Continued)

FOREIGN PATENT DOCUMENTS

| WO | 0118807 A | 3/2001 | |
|---|---|---|---|
| WO | WO2004017184 | * | 8/2003 |

*Primary Examiner* — Jeffrey Pwu
*Assistant Examiner* — Anthony Brown

(57) ABSTRACT

In order to provide a protection system (100; 100') for protecting data (D1+D2), for instance at least one data processing program and/or at least one software application, the protection system (100; 100') comprising at least one data storage unit (10) for storing the data (D1+D2), at least one main processing unit (20) which is designed for processing at least part (D1) of the data (D1+D2), in particular for processing the first data (D1) and optionally the encrypted second data (D2), the main processing unit (20) being connected with the data storage unit (10), at least one security unit (30), and at least one presentation processing unit (42) being connected with the main processing unit (20), wherein it is possible to prevent the use of illegal copies of the data (D1+D2) and wherein neither an authorization nor a registration is required for running the data (D1+D2), it is proposed that the security unit (30) and the presentation processing unit (42) exchange at least one key, in particular at least one up-front agreed session key, for decrypting the encrypted second data (D2) and/or for re-encrypting the originally encrypted and then decrypted second data (D2).

20 Claims, 4 Drawing Sheets

U.S. PATENT DOCUMENTS

| | | |
|---|---|---|
| 2004/0030898 A1 | 2/2004 | Tsuria et al. |
| 2004/0125707 A1* | 7/2004 | Vargas ........................ 369/30.18 |
| 2004/0139335 A1* | 7/2004 | Diamand et al. ............... 713/189 |
| 2004/0237100 A1* | 11/2004 | Pinder et al. .................... 725/31 |

* cited by examiner

SECURITY UNIT AND PROTECTION SYSTEM COMPRISING SUCH SECURITY UNIT AS WELL AS METHOD FOR PROTECTING DATA

The present invention relates in general to improving the security of data by at least one security unit for protecting data as well as by a method for protecting data.

The present invention further relates to a protection system for protecting data, for instance at least one data processing program and/or at least one software application, the protection system comprising

- at least one data storage unit for storing the data,
- at least one main processing unit which is designed for processing at least part of the data, in particular for processing the first data and optionally the encrypted second data, the main processing unit being connected with the data storage unit,
- the security unit, and
- at least one presentation processing unit being connected with the main processing unit (cf. prior art document WO 02/067097 A2).

In current systems, software applications like games or other executable software are protected by passwords, by encrypted program codes or by hardware units like dongles (see for example prior art documents EP 0 809 402 A1, U.S. Pat. No. 5,949,877 or WO 01/65342 A1). In particular, the protection is done internally in the program for example by a request for a password or by an encrypted program code or by a handshake with the dongle.

If the decryption of the encrypted program code respectively the request of the password or the handshake was successful, the application is unlocked and ready to be used. This scheme contains as part of its design a logical test that decides whether a program is unlocked or not. Hence possible intruders can use this single logical statement as a hook to crack the protection scheme of the system. So, no matter how sophisticated the rest of the protection scheme is, as long as there is a step accessible where the security measures can be bypassed, the security of the protection system is at risk.

For protecting digital content from copying or other misuse as it is transferred between devices or insecure links, data is typically encrypted. Thus an apparatus to secure transactions via the internet by encryption and decryption is known from prior art document WO 02/063580 A2. Furthermore, prior art documents U.S. Pat. No. 5,999,629 and US 2003/0065930 A1 disclose data encryption security modules.

A protection system as described above (cf. technical field) is disclosed in prior art document WO 02/067097 A2. This protection system establishes a secure channel between a first unit and a second unit for transferring digital content. When setting up the secure channel with mutual authentication a check is made against an authorization list containing authentication data of all authorized first units. Since the data transfer is restricted to authorized computers, the digital data can only be used at registered computers.

Starting from the disadvantages and shortcomings as described above and taking the prior art as discussed into account, an object of the present invention is to prevent the use of illegal copies of software applications by providing a protection system for digital data wherein neither an authorization nor a registration is required for running the data.

The object of the present invention is achieved by a security unit comprising the features of claim 1, by a protection system comprising the features of claim 4 as well as by a method comprising the features of claim 8. Advantageous embodiments and expedient improvements of the present invention are disclosed in the respective dependent claims.

The present invention is principally based on improving the security of data and is more specifically based on the technical principle of protecting data, in particular software and electronic data, for instance at least one data processing program and/or at least one software application respectively intellectual property in the form of software or software related electronic data, by a hardware security unit.

To this aim, said data is divided into first data and second data. The second data is encrypted in order to enforce protection of the data against illegal copying and piracy. Furthermore said second data can optionally be characterized by the fact that it does not need to be processed by the first or main data, in particular by the main software program, in an decrypted plaintext form.

This leads to the advantage that the security measures cannot be bypassed by any modifications or patches of the first or main data since the first or main data does not process the secured parts of the data in an unencrypted form. Thus the system is an end-to-end security solution where the first or main data, in particular the main program, possibly under attack does not process all the data that is necessary for a useful employment of the operation of the entire (or whole) data.

Said security unit and at least one presentation processing unit are exchanging at least one key, in particular at least one up-front agreed session key,

- for decrypting the encrypted second data and/or
- for re-encrypting the originally encrypted and then decrypted second data, wherein the re-encrypted second data can optionally be sent from the security unit to the at least one presentation processing unit, in particular via at least one main processing unit which is designed for processing at least part of the data, in particular for processing the first data and optionally the encrypted second data.

In a preferred embodiment of the present invention said hardware security unit processes only the second data respectively the encrypted part of the data. As a consequence, it can be considered as an essential part of this embodiment, i.e. of this security unit, of the protection system comprising this security unit as well as of the assigned method of the present invention that the key for the decryption of the encrypted part of the data is confined in the security unit so that the key is once written to the security unit by the provider of the data and is never passed on to any other entity by the security unit.

In an expedient embodiment of the present invention the security unit can be connected with the main processing unit or alternatively with the presentation processing unit. In any case, the security unit preferably contains the key, for example at least one up-front agreed session key, that is necessary to decrypt the encrypted second data. In other words, the second data is decrypted by the security unit or by the presentation unit with at least one decryption key being provided by the security unit.

The security unit can optionally be a smart card or at least the integrated circuit of a smart card, which leads to the advantage of the security unit being set up very efficiently.

Further, the present invention relates to a protection system for protecting the data. This protection system comprises at least one data storage unit designed for storing said data as well as said main processing unit designed for processing said first data and optionally the encrypted second data. The main processing unit is connected with said data storage unit. Additionally, said protection system comprises at least one security unit as described above and at least one presentation processing unit as described above, which is connected with the main processing unit.

According to an advantageous embodiment of the present invention the security unit or the presentation processing unit decrypts the second data, wherein the necessary key for decrypting the encrypted second data can be stored in the security unit by the supplier of the data.

If the actual decryption of the encrypted second data is taking place in the presentation processing unit, the decryption key is preferably transferred in at least one secure transaction from the security unit to the presentation processing unit.

Independently thereof or in combination therewith, in a preferred embodiment of the present invention the security unit re-encrypts the content of the decrypted second data with a preferably common session(al) key, in particular agreed upon with the presentation processing unit or with at least one rendering unit of the system. The rendering unit is expediently an output unit that is responsible for presenting for example audio information or video information to the user. Preferably the rendering unit comprises the presentation processing unit and at least one output device.

In an advantageous embodiment of the present invention, the presentation processing unit is designed for being provided with the processed first data as well as with the re-encrypted or encrypted second data, in particular by the main processing unit. The re-encrypted or encrypted content can optionally be forwarded by the main data, in particular by the main software program, to the rendering unit.

Moreover the presentation processing unit is preferably designed
  for decrypting the re-encrypted or encrypted second data with the key,
  for combining the processed first data and the decrypted second data, and
  for sending the combined first and second data to the output device being connected with the presentation processing unit and being designed for outputting the combined first and second data.

Thus in contrast to conventional security systems the scheme of the present invention does not contain as part of its design a logical test that can be used as a hook to crack the protection scheme. The present invention addresses this shortcoming of conventional systems by the introduction of a dedicated security unit that cannot be analyzed regarding its internal operation. In other words, the protection system according to the present invention guarantees that the data cannot be used without an individual corresponding hardware unit, namely said security unit.

As stated above, the output device and the presentation processing unit can be comprised or grouped in the rendering unit. This rendering unit is preferably designed for decrypting finally the second data and for using this second data in conjunction with the other presentation data processed by the main data, in particular by the main software program. In this case, the data, in particular the software application, is only usable if the encrypted part of the data is available at the rendering unit in a decrypted form.

The present invention further relates to a method to improve security of data, in particular of software. The data, in particular the software program, will not be executed unless a security unit as described above is in connection with the data.

According to the teaching of the present invention, a method comprising the following steps is proposed to prevent illegal copying of especially digital data:

(a.1) dividing the data into first data and second data and
(a.2) transferring the data to the main processing unit, wherein in particular step (a.1) and step (a.2) can take place simultaneously.

Moreover the method comprises the steps of
(b.1) processing at least part of the data, in particular the first data and optionally the encrypted second data by the main processing unit; and
(b.2.i) decrypting and then re-encrypting the encrypted second data by means of at least one key being exchanged between the security unit and the presentation processing unit, or
(b.2.ii) decrypting the encrypted second data by means of at least one key being exchanged between the security unit and the presentation processing unit,
wherein in particular step (b.1) and step (b.2) can take place simultaneously.

Thus the present invention introduces a dedicated security unit that cannot be analyzed regarding its internal operation. Said security unit does not execute the main flow of the program that is to be protected but provides preferably a special subset of encrypted data, in particular to the rendering unit as described above.

According to an expedient embodiment of the present invention only the rendering unit but not the main program is able to decrypt the special subset of encrypted data. With this scheme, the security measures are separated from the execution of the main program so that both areas can be optimized independently from each other.

The main program can for example be executed on a standard personal computer processor whereas the processing of the encrypted parts of the data is done in specific protected hardware units like smart cards and optionally in the rendering device.

As stated above in other words, the method according to the present invention optionally allows the additional steps of
(c.1) transferring the processed first data from the main processing unit to the presentation processing unit;
(c.2.i) transferring the re-encrypted second data from the security unit to the presentation processing unit, in particular via the main processing unit, or
(c.2.ii) transferring the encrypted second data from the main processing unit to the presentation processing unit;
(d) decrypting the re-encrypted or encrypted second data by the presentation processing unit;
(e) combining the processed first data and the decrypted second data by the presentation processing unit;
(f) sending the combined first and second data from the presentation processing unit to at least one output device; and
(g) outputting the combined first and second data by the output device,
wherein in particular step (c.1) and step (c.2.i) or (c.2.ii) can take place simultaneously.

The present invention finally relates to the use of at least one security unit as described above and/or of at least one protection system as described above and/or of the method as described above
  for preventing illegal and/or unauthorized copying of software or software related electronic media and/or
  for preventing illegal und/or unauthorized use of software or software related electronic media,
  especially for the protection of copyrights and/or of intellectual property.

Thus the application area of the present invention is the protection of intellectual properties in the form of software or software related electronic media. The present invention describes an application option of non-specific smart card I[ntegrated]C[ircuit]s for copy protection applications.

As already discussed above, there are several options to embody as well as to improve the teaching of the present invention in an advantageous manner. To this aim, reference is made to the claims respectively dependent on claim 1, on claim 4 and on claim 8; further improvements, features and advantages of the present invention are explained below in more detail with reference to two preferred embodiments by way of example and to the accompanying drawings (cf. FIG. 1 to FIG. 4) where FIG. 1 shows schematically a first embodiment of a protecting system according to the present invention comprising a security system according to the present invention;

The same reference numerals are used for corresponding parts in FIG. 1 to FIG. 4.

Figure 1:
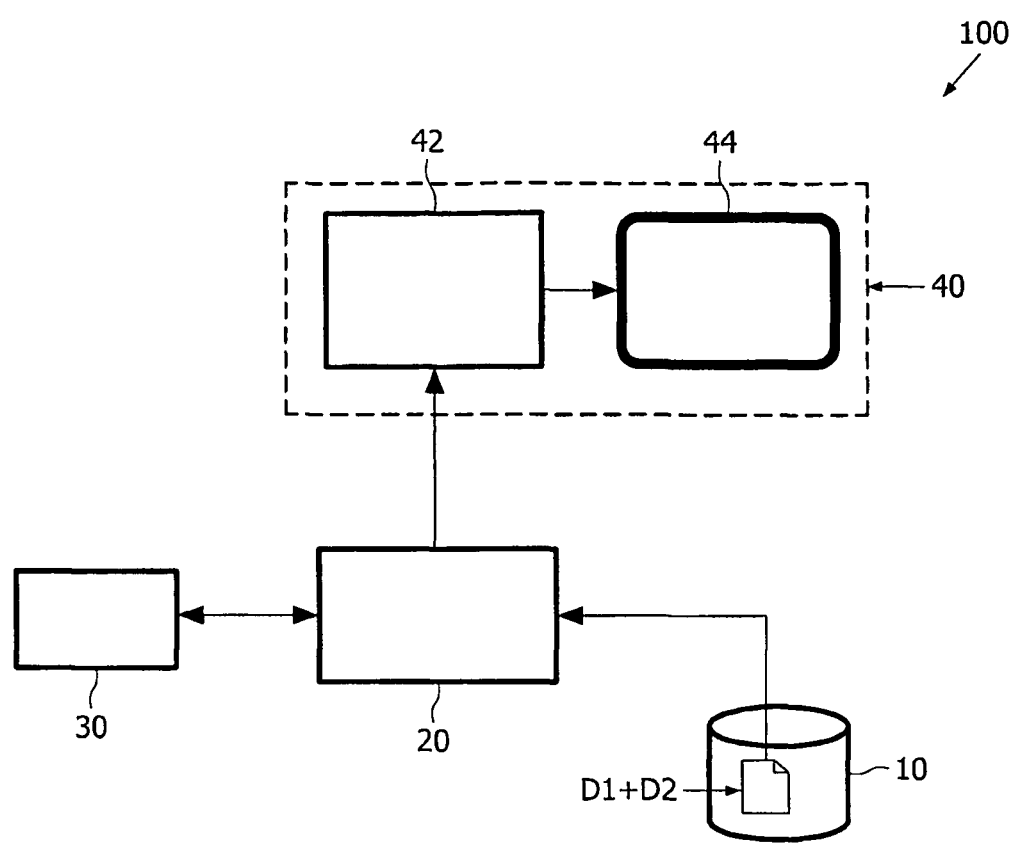
Figure 2:
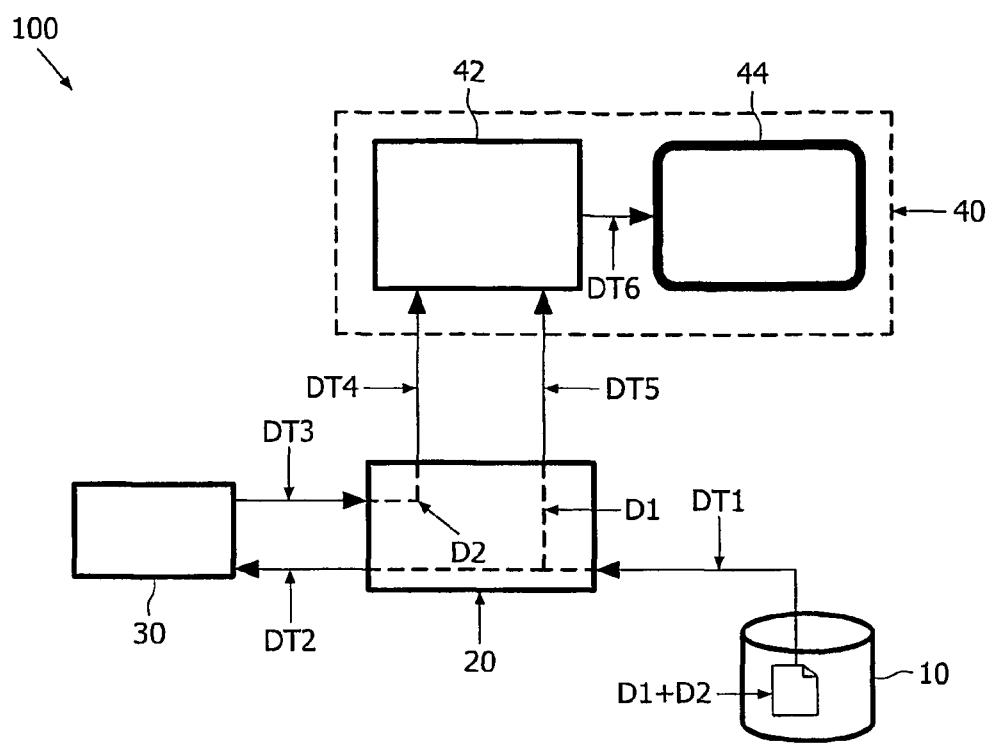
FIG. 2 shows schematically the flow of data in the protection system of FIG. 1 in accordance with the method according to the present invention.
Figure 3:
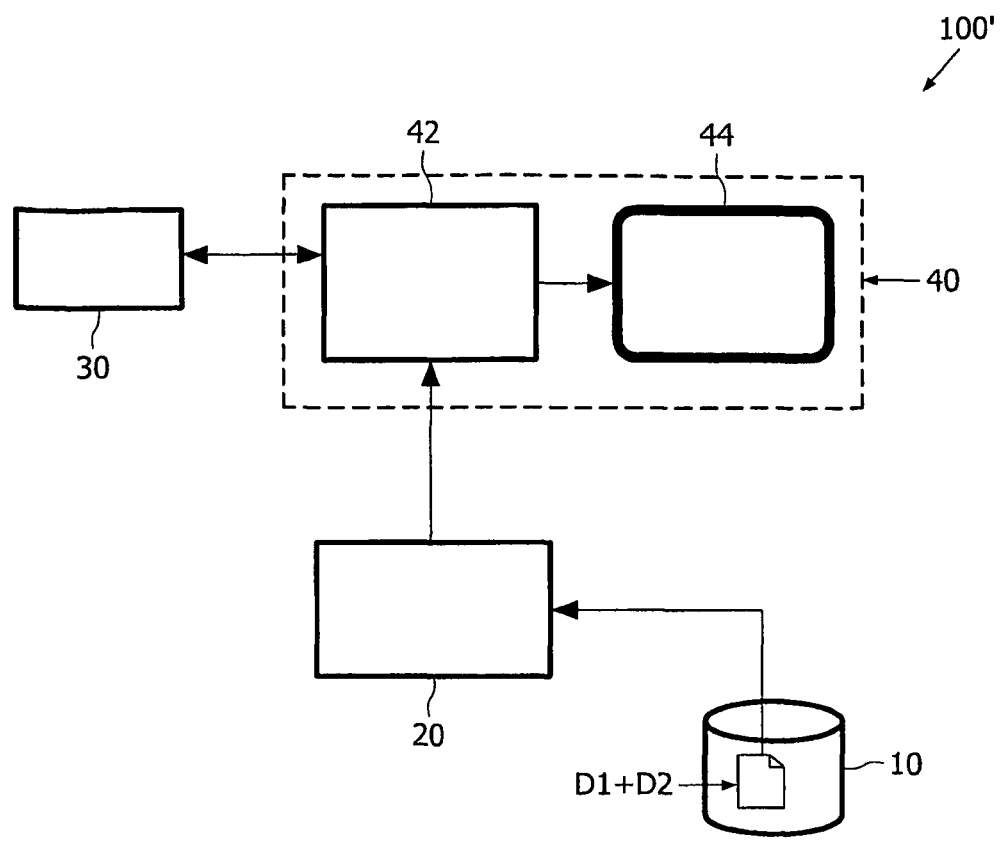
FIG. 3 shows schematically a second embodiment of a protecting system according to the present invention comprising a security system according to the present invention.
Figure 4:
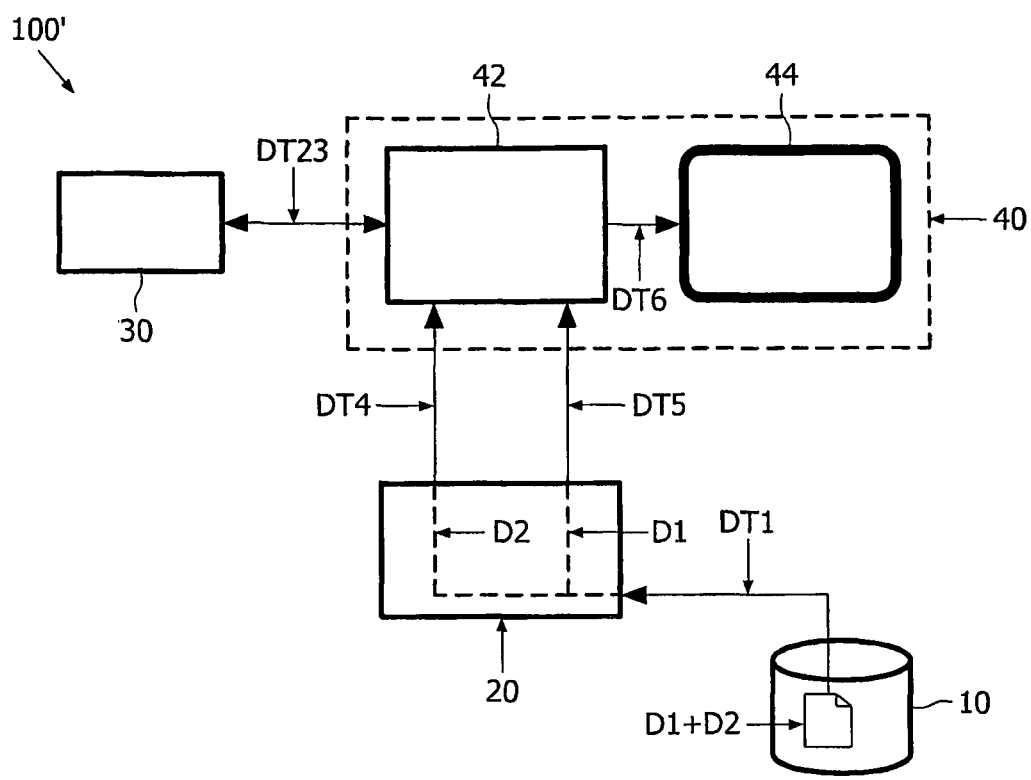
FIG. 4 shows schematically the flow of data in the protection system of FIG. 3 in accordance with the method according to the present invention.

In order to avoid unnecessary repetitions the following description regarding the embodiments, features and advantages of the present invention (unless stated otherwise) relates to both embodiments of the protection system 100 (cf. FIG. 1), 100' (cf. FIG. 3) according to the present invention as well as to both examples of the flow of data in the respective protection system 100, 100' (FIG. 2 and FIG. 4).

In the following, the first example of the protection system 100 according to the invention is depicted in FIG. 1.

The operation principle of the protection system 100 relates to an electronic computation system (=so-called computer system) comprising
- a data storage (unit) 10,
- a main processing unit (=main processor 20) connected to the data storage unit 10,
- a security unit 30 connected to the main processing unit 20, and
- a rendering unit 40 comprising
    - a presentation processing unit (=presentation processor 42) connected to the main processing unit 20 as well as
    - an output device 44 connected to the presentation processing unit 42.

In this context, the term "connected" refers to a connection by wire or to a wireless connection.

This protection system 100 is based on following technical means and methods:

(i) Encryption of parts of the software D1+D2:

Parts of the software, namely the encrypted part D2 of the software application delivered to the customer, are not processed in an unencrypted (plaintext) form by the main software program D1 in the main processing unit 20. In addition, the outcome of the main software program D1 cannot be employed in a useful way without proper decryption of the encrypted software D2.

(ii) Decryption function and re-encryption function in the security unit 30:

The security unit 30 is designed for the decryption of the encrypted software D2. In addition, the security unit 30 re-encrypts the encrypted software D2 with an up-front agreed session key that is shared between the security unit 30 and the security function in the rendering device 40. The security unit 30 can be formed for instance by a smart card.

(iii) Security function and decryption function in the rendering device 40:

This security function works out a common session key with the security unit 30, and subsequently decrypts and renders the encrypted software D2 that was re-encrypted by the security unit 30. The rendering unit 40 has the capability of combining the (encrypted-->decrypted-->re-encrypted-->decrypted) software D2 with the other data D1 processed by the main software program.

The flow of data D1+D2 in the protection system 100 of FIG. 1 is shown in FIG. 2:

The data storage 10 contains the digital program data D1+D2 of the application. In a data transfer DT1 the main processor 20 reads this program data D1+D2 from the data storage 10 and processes the actual program part D1 of the whole data D1+D2.

The other part D2 of the entire data D1+D2 that is not to be processed by the main processor 20 is transferred to the security unit 30 in a data transfer DT2. This part D2 of the program data D1+D2 is present only in an encrypted form.

The security unit 30 decrypts this data D2 and re-encrypts it with a key that is exchanged between the security unit 30 and the presentation processor 42 located in the presentation unit 40. After the re-encryption of the data part D2, the security unit 30 sends the re-encrypted data D2 back to the main processor 20 in a data transfer DT3. The main processor 20 passes the re-encrypted data D2 in a data transfer DT4 along with the processed other data D1 in a data transfer DT5 to the presentation processor 42.

In the presentation processor 42 the re-encrypted data D2 is decrypted and combined with the other data D1 that was processed in the main processor 20. The resulting data D1+D2 is then entirely unencrypted and thus can be sent in a data transfer DT6 to an output device 44 where the data D1+D2 is finally presented.

In contrast to the first embodiment of the protection system 100 (cf. FIGS. 1 and 2), in the second embodiment of the protection system 100' (cf. FIGS. 3 and 4) the security unit 30 is connected with the presentation processing unit 42. This security unit 30 of the protection system 100' is designed for storing the key (the so-called decryption key) for the decryption of the encrypted software D2.

Moreover the security function as well as the decryption function of the protection system 100' according to FIG. 3 differs from the security function as well as from the decryption function of the protection system 100 according to FIG. 1. Thus, in the protection system 100' according to FIG. 3 the security function may be localized in the presentation processing unit 42 and works out one or more common session keys with the security unit 30.

The security function subsequently receives the key(s) from the security unit 30; this key is (these keys are) necessary for the decryption of the encrypted software D2. After the decryption of the encrypted software D2 the rendering unit 40 renders the related data.

In other words, in the protection system 100' according to FIG. 3 the security unit 30 provides the rendering unit 40 with at least one decryption key for decrypting the encrypted software D2.

The protection system 100' according to FIG. 3 is designed in such way that the actual decryption of the encrypted software D2 takes place in the presentation processing unit 42 of a rendering unit 40, wherein the decryption keys are transferred in a secured transaction DT23 from the security unit 30 to the presentation processor 42 of the rendering unit 40.

The flow of data D1+D2 in the protection system 100' of FIG. 3 is shown in FIG. 4:

The data storage 10 contains the digital program data D1+D2 of the application. In the data transfer DT1 the main processor 20 reads the program data D1+D2 from the data storage 10 and processes the program data D1. After the processing the processed data D1 is transferred to the presentation processor 42 in a data transfer DT5.

The encrypted part D2 of the program data D1+D2 is not processed by the main processor 20 and is forwarded in a data transfer DT4 to the presentation processor 42. The presentation processor 42 decrypts this data D2 with a decryption key being exchanged between the security unit 30 and the presentation processor 42. To this aim, the security unit 30, that is associated with the program data D1+D2, transfers this decryption key for the encrypted part D2 of the program data D1+D2 to the presentation processing unit 42 in the secure transaction DT23.

After the decryption of the encrypted data D2, this decrypted second data D2 is combined in the presentation processor 42 with the other data D1 having been processed in the main processor 20. The resulting data D1+D2 is then entirely unencrypted and thus can be sent in a data transfer DT6 to an output device 44 where the data D1+D2 is finally presented.

LIST OF REFERENCE NUMERALS 100 protection system (first embodiment; cf. FIGS. 1 and 2)
100' protection system (first embodiment; cf. FIGS. 3 and 4)
10 data storage unit or data storage
20 main processing unit or main processor
30 security unit
40 rendering unit or presentation unit
42 presentation processing unit or presentation processor of the rendering unit or presentation unit 40
44 output device of the rendering unit or presentation unit 40
D1 first data
D2 second data
D1+D2 data
DT1 data transfer of the data D1+D2 from the data storage unit 10 to the main processing unit 20
DT2 data transfer of the encrypted second data D2 from the main processing unit 20 to the security unit 30 (first embodiment; cf. FIGS. 1 and 2)
DT23 exchange of the key between the security unit 30 and the presentation processing unit 42 (second embodiment; cf. FIGS. 3 and 4)
DT3 data transfer of the re-encrypted second data D2 from the security unit 30 to the main processing unit 20 (first embodiment; cf. FIGS. 1 and 2)
DT4 data transfer of the re-encrypted (first embodiment; cf. FIGS. 1 and 2) or encrypted (second embodiment; cf. FIGS. 3 and 4) second data D2 from the main processing unit 20 to the presentation processing unit 42
DT5 data transfer of the processed first data D1 from the main processing unit 20 to the presentation processing unit 42
DT6 data transfer of the combined data D1+D2 from the presentation processing unit 42 to the output device 44

The invention claimed is:

1. A computer security system having additional security for data, the computer security system comprising:
a data storage device that transmits both encrypted software and unencrypted software;
a main processor that receives both the encrypted software and the unencrypted software but processes only the unencrypted software;
a rendering device that receives the unencrypted software from the main processor and conditionally produces output based upon the encrypted software; and
a hardware security device that determines whether the rendering device can produce output based upon the encrypted software.

2. The computer security system of claim 1, wherein the hardware security device decrypts the encrypted software and re-encrypts the decrypted software to produce re-encrypted software.

3. The computer security system of claim 2, wherein the rendering device decrypts the re-encrypted software to produce re-decrypted software and combines the re-decrypted software with the unencrypted software.

4. The computer security system of claim 1, wherein the main processor is connected to the hardware security device.

5. The computer security system of claim 1, wherein the main processor is connected to the rendering device.

6. The computer security system of claim 1, wherein the unencrypted software cannot be employed in a useful way without decrypting the encrypted software.

7. The computer security system of claim 1, wherein the hardware security device and the rendering device share a session key.

8. The computer security system of claim 7, wherein the hardware security device uses the shared session key to re-encrypt a decrypted version of the encrypted software.

9. The computer security system of claim 1, wherein the main processor transfers the encrypted software to the hardware security device.

10. The computer security system of claim 9, wherein the hardware security device sends a re-encrypted version of the encrypted software to the main processor.

11. The computer security system of claim 1, wherein the unencrypted software is a game program and combining a decrypted version of the encrypted software with the unencrypted software enables full display of the game program in an output device.

12. The computer security system of claim 11, wherein the output device displays a degraded version of the game program when the encrypted software is not decrypted.

13. A method of providing additional security for data in a computer security system, the method comprising:
receiving both encrypted and unencrypted software in a main processor;
processing the unencrypted software in the main processor;
decrypting the encrypted software in a hardware security device;
re-encrypting the decrypted software in the hardware security device;
decrypting the re-encrypted software in a rendering device to produce re-decrypted software;
combining the re-decrypted software with the unencrypted software in the rendering device.

14. The method of claim 13, wherein the unencrypted software cannot be employed in a useful way without decrypting the encrypted software.

15. The method of claim 13, further comprising:
sharing a session key between the hardware security device and the rendering device.

16. The method of claim 15, further comprising:
using the shared session key to re-encrypt a decrypted version of the encrypted software.

17. The method of claim 13, further comprising:
transferring the encrypted software from the main processor to the hardware security device.

18. The method of claim 13, further comprising:
sending a re-encrypted version of the encrypted software from the hardware security device to the main processor.

19. The method of claim 13, wherein the unencrypted software is a game program, the method further comprising:
combining a decrypted version of the encrypted software with the unencrypted software to enable full display of the game program in an output device.

20. The method of claim 19, further comprising:
displaying a degraded version of the game program when the encrypted software is not decrypted.

* * * * *